United States Patent
Yang

(10) Patent No.: US 8,591,370 B2
(45) Date of Patent: Nov. 26, 2013

(54) DUAL-DRIVE ELECTRIC MACHINE HAVING CONTROLLABLE PLANETARY GEAR SET (2)

(76) Inventor: Tai-Her Yang, Dzan-Hwa (TW)

(*) Notice: Subject to any disclaimer, the term of this patent is extended or adjusted under 35 U.S.C. 154(b) by 42 days.

(21) Appl. No.: 13/033,849

(22) Filed: Feb. 24, 2011

(65) Prior Publication Data
US 2012/0220411 A1  Aug. 30, 2012

(51) Int. Cl.
*F16H 48/06* (2006.01)
(52) U.S. Cl.
USPC ............. 475/156; 475/5; 475/149; 475/151; 475/154
(58) Field of Classification Search
USPC .................. 475/5, 149, 151, 154, 156
See application file for complete search history.

(56) References Cited

U.S. PATENT DOCUMENTS

| | | | |
|---|---|---|---|
| 2004/0077448 A1* | 4/2004 | Oshidari et al. | 475/5 |
| 2012/0178566 A1* | 7/2012 | Yang | 475/5 |
| 2012/0220409 A1* | 8/2012 | Yang | 475/149 |
| 2012/0220412 A1* | 8/2012 | Yang | 475/156 |
| 2012/0220413 A1* | 8/2012 | Yang | 475/156 |
| 2012/0232729 A1* | 9/2012 | Yang | 701/22 |

FOREIGN PATENT DOCUMENTS

CN  201423916  3/2010

* cited by examiner

*Primary Examiner* — Derek D Knight
(74) *Attorney, Agent, or Firm* — Bacon & Thomas, PLLC

(57) ABSTRACT

A clutch device includes a dual-drive electric machine combined with a planetary gear set and at least one controllable brake device. The at least one controllable brake device controls transmission or release between a first rotation shaft at a first output/input end, a second rotation shaft at a second output/input end and a sleeve type rotation shaft (AS101) at a third, thereby controlling interactive operations between the dual-drive electric machine and the output/input ends.

18 Claims, 3 Drawing Sheets

US 8,591,370 B2

DUAL-DRIVE ELECTRIC MACHINE HAVING CONTROLLABLE PLANETARY GEAR SET (2)

BACKGROUND OF THE INVENTION (a) Field of the Invention

The present invention relates to a clutch device structured by a dual-drive electric machine combined with a planetary gear set (DG101) and at least one controllable brake device. The at least one controllable brake device locks or releases at least one of a first rotation shaft (S101) at a first output/input end of the clutch device, a second rotation shaft (S102) at a second output/input end of the clutch device, and a sleeve-type rotation shaft (AS101) at an output/input end of a planetary gear set (DG101) to control interactive operations between the dual-drive electric machine (EM100) and output or input ends of the clutch device.

(b) Description of the Prior Art

Conventionally, a friction type electromagnetic clutch device is often installed between the output/input end of a rotation electric machine and a load The friction type electromagnetic clutch device is electromagnetically actuated or deactivated to perform operations of combining or releasing, thereby enabling the load to be engaged with or released from the rotary electric machine. One primary disadvantage of the conventional art is that a residual rotary torque often remains during release, which may cause kinetic energy loss and ineffective operation.

SUMMARY OF THE INVENTION

The present invention provides a dual-drive electric machine having a controllable planetary gear set, in which an inner rotation part (EM101) of the dual-drive electric machine (EM100) is combined with a sun wheel (W101) of the planetary gear set (DG101). A first rotation shaft (S101) is shared by the inner rotation part (EM101) and sun wheel (W101) and serves as a first output/input end of the dual-drive electric machine. A second rotation shaft (S102) is connected with a rocker arm (A101) to which is coupled a planetary wheel (W103), the second rotation shaft (S102) serving as a second output/input end, and an outer annular wheel (W102) of the planetary gear set (DG101) is combined with an outer rotation part (EM102) of the electric machine (EM100) and with a sleeve type rotation shaft (AS101) that serves as a third output/input end. Some or all of the three output/input ends are respectively connected to an action side of a corresponding controllable brake device, and the other action side of the controllable brake device is connected to a housing (H100). By controlling the at least one controllable brake device to perform brake locking or releasing, the at least one brake controllable brake device controls transmission of power between the corresponding first rotation shaft (S101) at the first output/input end, second rotation shaft (S102) at the second output/input end, sleeve type rotation shaft (AS101) at the output/input end of the planetary gear set (DG101) and dual-drive electric machine (EM100).

DESCRIPTION OF MAIN COMPONENT SYMBOLS

A101: Rocker arm
AS101: Sleeve type rotation shaft
BK101, BK102, BK103: Controllable brake device
DG101: Planetary gear set
EM100: Dual-drive electric machine
EM101: Inner rotation part of electric machine
EM102: Outer rotation part of electric machine
H100: Housing
S101, S102: Rotation shaft
W101: Sun wheel
W102: Outer annular wheel
W103: Planetary wheel

DETAILED DESCRIPTION OF THE PREFERRED EMBODIMENTS

Conventionally, a friction type electromagnetic clutch device is often installed between the output/input end of a rotation electric machine and a load. The friction type electromagnetic clutch device is electromagnetically activated to perform operations of combining or releasing and thereby enable the load to be engaged with or released from the rotary electric machine. One primary disadvantage of the conventional art is that residual rotary torque often remains during releasing, which may cause kinetic energy loss and ineffective operation.

The present invention provides a dual-drive electric machine having a controllable planetary gear set, in which an inner rotation part (EM101) of the dual-drive electric machine (EM100) is combined with a sun wheel (W101) of a planetary gear set (DG101). A first rotation shaft (S101) is shared by the by the inner rotation part (EM101) and the sun wheel (W101) and serves as an output/input end of the clutch device. A second rotation shaft (S102) is connected with a rocker arm (A101) to which a planetary wheel (W103) is coupled and that serves as an output/input end. An outer annular wheel (W102) of the planetary gear set (DG101) is combined with an outer rotation part (EM102) of electric machine (EM100) and with a sleeve type rotation shaft (AS101) that serves as a third output/input end. Some or all of the three output/input ends are respectively connected to an action side of at least one corresponding controllable brake device, and the other action side of each controllable brake device is connected to a housing (H100). By controlling the controllable brake device to perform brake locking or releasing, transmission and release operations between some or all of the first rotation shaft (S101) at the first output/input end, the second rotation shaft (S102) at the second output/input end, the sleeve type rotation shaft (AS101) at the output/input end of the planetary gear set (DG101) and the dual-drive electric machine (EM100) are enabled to be controlled.

Figure 1:
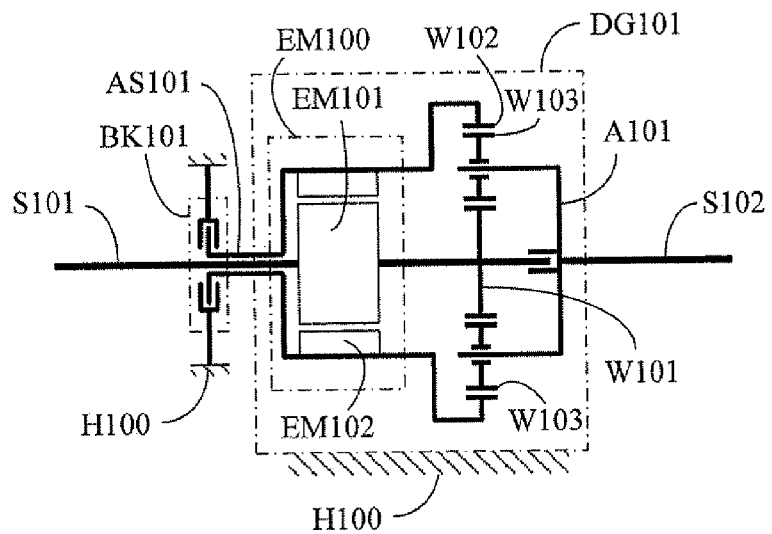
FIG. 1 is a schematic view showing the clutch device of a first preferred embodiment of the present invention.

Preferred structures and embodiments of the dual-drive electric machine having a controllable planetary gear set of the present invention include the following:

As shown in FIG. 1, the first rotation shaft (S101) is shared by a sun wheel (W101) of the planetary gear set (DG101) and the inner rotation part (EM101) of the dual-drive electric machine (EM100) to serve as the first output/input end. The outer annular wheel (W102) is combined with the outer rotation part (EM102) of the electric machine (EM100) and combined with the sleeve type rotation shaft (AS101). The sleeve type rotation shaft (AS101) is rotatably sleeved on the first rotation shaft (S101) to serve as a second output/input end and engageable with an action side of the first controllable brake device (BK101), while another action side of the first controllable brake device (BK101) is fixed in the housing (H100). The planetary gear set (DG101) is also fixed in the housing (H100), and a rocker arm (A101) coupled to the planetary wheel (W103) of the planetary gear set (DG101) is provided for driving the second rotation shaft (S102) to serve as a second output/input end.

The clutch device of FIG. 1 thus includes the following:

Planetary gear set (DG101): which is constituted by the sun wheel (W101) and outer annular wheel (W102) and at least one planetary wheel (W103), in the form of gears engaging with each other or friction wheels mutually performing friction transmission to provide a planetary gear set function, and further including the first rotation shaft (S101), the second rotation shaft (S102), the rocker arm (A101), the sleeve type rotation shaft (AS101), and a bearing, the planetary gear set (DG101) being installed with a shell combined with the housing (H100);

Rocker arm (A101): having one end rotatably coupled to the planetary wheel (W103) and another end connected to the second rotation shaft (S102);

First controllable brake device (BK101): which is constituted by a brake device controlled by a manual force, mechanical force, hydraulic force, pneumatic force, or electromagnetic force, and having two controllable action sides for enabling control of brake locking states of engagement or release, wherein one of the action sides is connected to the sleeve type rotation shaft (AS101), and the other action side is fixed in the housing (H100);

Dual-drive electric machine (EM100): which is constituted by a DC or AC, brush or brushless, synchronous or non-synchronous dual-drive electric machine, having an inner rotation part (EM101) and an outer rotation part (EM102), and installed with end covers, bearings and related electric conduction devices used to conduct electric energy, the inner rotation part (EM101) and the outer rotation part (EM102) being coaxially rotated, wherein the inner rotation part (EM101) is combined with the rotation shaft (S101), and the outer rotation part is combined with the outer annular wheel (W102);

First rotation shaft (S101): which is shared by the sun wheel (W101) of the planetary gear set (DG101) and the inner rotation part (EM101) of the dual-drive electric machine (EM100) and serves as a first output/input end, the outer annular wheel (W102) being combined with the outer rotation part (EM102) and combined with the sleeve type rotation shaft (AS101), the sleeve type rotation shaft (AS101) being rotated and sleeved on the first rotation shaft (S101) to serve as a second output/input end, the sleeve type rotation shaft (AS101) being connected to an action side of the first controllable brake device (BK101) while the other action side of the first controllable brake device (BK101) is fixed in the housing (H100), and the rocker arm (A101) being linked by the planetary wheel (W103) of the planetary gear set (DG101) and provided for driving the second rotation shaft (S102) to serve as a third output/input end.

According to the embodiment shown in FIG. 1, the operations of the dual-drive electric machine having a controllable planetary gear set of the present invention include one or more than one of following functions:

When the first controllable brake device (BK101) is controlled to be in the releasing state, and the dual-drive electric machine (EM100) is not operated as an electric machine, the transmission relations between the first rotation shaft (S101), the second rotation shaft (S102), and the sleeve type rotation shaft (AS101) are in the releasing state allowing idle rotation;

When the first controllable brake device (BK101) is controlled to be in the releasing state, and the dual-drive electric machine (EM100) is operated as an electric machine, the corresponding interactive operations of the power generator function or the motor function of the electric machine (EM100) are correspondingly performed between the inner rotation part (EM101) and the outer rotation part (EM102) according to the damping of an external load or rotation torque, the rotation speed and the rotation direction of the externally input rotary kinetic energy being sustained by the first rotation shaft (S101), the second rotation shaft (S102), and the sleeve type rotation shaft (AS101);

When the first controllable brake device (BK101) is controlled to be in the brake locking state, and the dual-drive electric machine (EM100) is not operated as an electric machine, the transmission relation between the first rotation shaft (S101) and the second rotation shaft (S102) is in a connecting relation allowing for transmission; and When the first controllable brake device (BK101) is controlled to be in the brake locking state, and the dual-drive electric machine (EM100) is operated as an electric machine, interaction between the inner rotation part (EM101) and the outer rotation part (EM102) provides a power generator function or a motor function for performing interactive operations according to the damping of the external load or the externally input rotary kinetic energy sustained by the first rotation shaft (S101) and the second rotation shaft (S102).

The interactive operations performed by the dual-drive electric machine (EM100) may include receiving the driving control of externally input electric energy to operate as a motor for individually driving the load, or working with the externally input rotary kinetic energy for commonly driving the load.

The interactive operations performed by the mentioned dual-drive electric machine (EM100) may also include receiving the driving of the externally input rotary kinetic energy or the driving of the load inertia kinetic energy for providing a power generator function, so as to output the electric energy to drive an external electric load or charge an external electric energy storing device.

Figure 2:
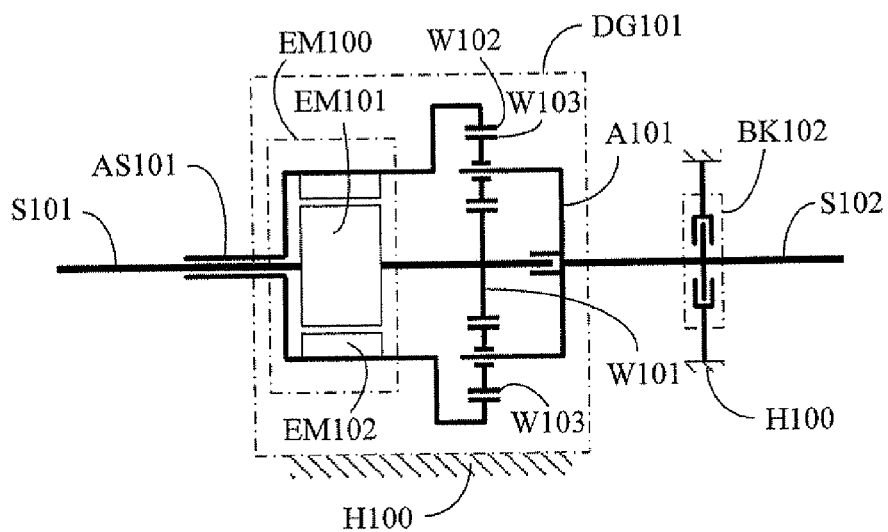
FIG. 2 is a schematic view showing the clutch device of a second preferred embodiment of the present invention.

As shown in FIG. 2, the first rotation shaft (S101) is shared by the sun wheel (W101) of the planetary gear set (DG101) and the inner rotation part (EM101) of the dual-drive electric machine (EM100) serves as a first output/input end, the outer annular wheel (W102) being combined with the outer rotation part (EM102) and combined with the sleeve type rotation shaft (AS101), the sleeve type rotation shaft (AS101) being sleeved on the first rotation shaft (S101) to serve as a second output/input end, the rocker arm (A101) being linked by the planetary wheel (W103) of the planetary gear set (DG101) being provided for driving the second rotation shaft (S102) to serve as a second output/input end, and the second rotation shaft (S102) or the rocker arm (A101) being connected to an action side of the controllable brake device (BK102) while the other action side of the controllable brake device (BK102) is fixed in the housing (H100).

The clutch device shown in FIG. 2 mainly consists of:

Planetary gear set (DG101): which is constituted by a sun wheel (W101), an outer annular wheel (W102), and at least one planetary wheel (W103), and includes gears engaging with each other or friction wheels mutually performing friction transmission to provide a planetary gear set function, and further including the first rotation shaft (S101), the second rotation shaft (S102), the rocker arm (A101), the sleeve type rotation shaft (AS101) and a bearing installed within a shell combined in the housing (H100);

Rocker arm (A101): having one end provided for allowing the planetary wheel (W103) to rotate and link, and the other end being connected to the second rotation shaft (S102);

A second controllable brake device (BK102): which is constituted by a brake device controlled by manual force, mechanical force, hydraulic force, or pneumatic force, or electromagnetic force, and having two controllable action sides for controlling brake locking states of engagement or release, wherein one of the action sides is connected to the rotation shaft (S102) or rocker arm (A101), and the other action side is fixed in the housing (H100);

Dual-drive electric machine (EM100): which is constituted by a DC or AC, brush or brushless, synchronous or non-synchronous dual-drive electric machine, having an inner rotation part (EM101) and an outer rotation part (EM102), and installed with end covers, bearings and related electric conduction devices used to supply electric energy, the inner rotation part (EM101) and the outer rotation part (EM102) being coaxially rotated, wherein the inner rotation part (EM101) is combined with the first rotation shaft (S101), and the outer rotation part (EM102) is combined with the outer annular wheel (W102);

First rotation shaft (S101): which is shared by the sun wheel (W101) of the planetary gear set (DG101) and the inner rotation part (EM101) of the dual-drive electric machine (EM100) to serve as the first output/input end, wherein the outer annular wheel (W102) is combined with the outer rotation part (EM102) and combined with the sleeve type rotation shaft (AS101), and the sleeve type rotation shaft (AS101) is rotatably sleeved on the first rotation shaft (S101) to serve as the second output/input end;

Rocker arm (A101): which is linked by the planetary wheel (W103) of the planetary gear set (DG101) for driving the second rotation shaft (S102) to serve as the second output/input end, wherein the second rotation shaft (S102) or the rocker arm (A101) is connected to an action side of the controllable brake device (BK102) while the other action side of the controllable brake device (BK102) is fixed in the housing (H100).

According to the embodiment shown in FIG. 2, the operations of the dual-drive electric machine having a controllable planetary gear set of the present invention include one or more than one of following functions:

When the controllable brake device (BK102) is controlled to be in the releasing state, and the dual-drive electric machine (EM100) is not operated as an electric machine, the transmission relations between the first rotation shaft (S101), the sleeve type rotation shaft (AS101), and the rotation shaft (S102) are in the releasing state allowing idle rotation;

When the second controllable brake device (BK102) is controlled to be in the releasing state, and the dual-drive electric machine (EM100) is operated as an electric machine, the corresponding power generator function or motor function are correspondingly performed between the inner rotation part (EM101) and the outer rotation part (EM102) according to the damping of the external load or the rotation torque, the rotation speed and the rotation direction of the externally input rotary kinetic energy being sustained by the first rotation shaft (S101), the second rotation shaft (S102) and the sleeve type rotation shaft (AS101);

When the controllable brake device (BK102) is controlled to be in the brake locking state, and the dual-drive electric machine (EM100) is not operated as an electric machine, the transmission relation between the first rotation shaft (S101) and the sleeve type rotation shaft (AS101) is in a connecting relation allowing for transmission;

When the second controllable brake device (BK102) is controlled to be in the brake locking state, and the dual-drive electric machine (EM100) is operated as an electric machine, interaction between the inner rotation part (EM101) and the outer rotation part (EM102) provides a power generator function or a motor function for performing interactive operations according to the damping of the external load or the externally input rotary kinetic energy sustained by the first rotation shaft (S101) and the sleeve type rotation shaft (AS101);

The interactive operations performed by the dual-drive electric machine (EM100) may include receiving the driving control of externally input electric energy to operate as a motor for individually driving the load, or working with externally input rotary kinetic energy for commonly driving the load.

The interactive operations performed by the dual-drive electric machine (EM100) may also include being driven by the externally input rotary kinetic energy or load inertia kinetic energy to provide a power generator function, so as to output electric energy to drive an external electric load or charge an external electric energy storing device.

Figure 3:
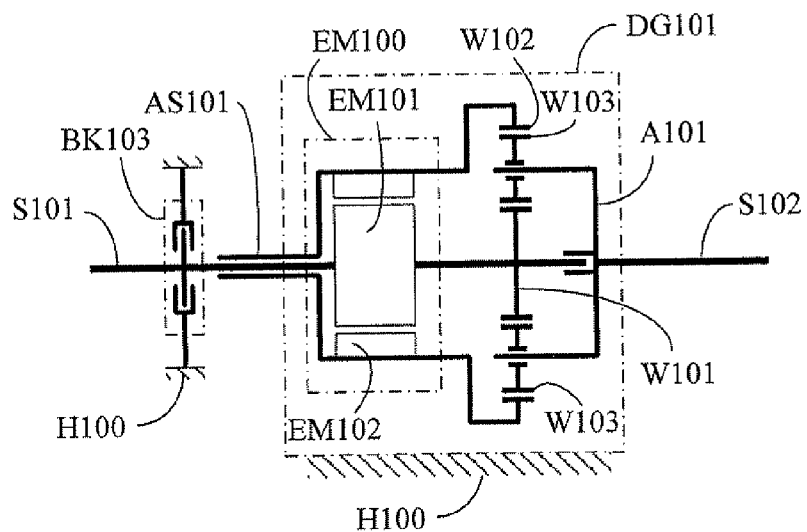
FIG. 3 is a schematic view showing the clutch device of a third preferred embodiment of the present invention.

As shown in FIG. 3, the first rotation shaft (S101) is shared by the sun wheel (W101) of the planetary gear set (DG101) and the inner rotation part (EM101) of the dual-drive electric machine (EM100) to serve as the first output/input end and provided for connecting to an action side of a third controllable brake device (BK103) while the other action side of the third controllable brake device (BK103) is fixed in the housing (H100), the planetary gear set (DG101) also being fixed in the housing (H100), the outer annular wheel (W102) of the planetary gear set (DG101) being combined with the outer rotation part and the sleeve type rotation shaft (AS101), the sleeve type rotation shaft (AS101) serving as a second output/input end, and the planetary wheel (W103) of the planetary gear set (DG101) being provided for linking the rocker arm (A101) and driving the rotation shaft (S102) to serve as a third output/input end.

The clutch device shown in FIG. 3 mainly consists of:

Planetary gear set (DG101): which is constituted by a sun wheel (W101), an outer annular wheel (W102) and at least one planetary wheel (W103) in the form of gears engaging with each other or friction wheels mutually performing friction transmission to provide the planetary gear set function, and further including the first rotation shaft (S101), the second rotation shaft (S102), the rocker arm (A101), the sleeve type rotation shaft (AS101) and a bearing, each installed within a shell combined with the housing (H100);

Rocker arm (A101): having one end provided for allowing the planetary wheel (W103) to rotate and link, and the other end being connected to the second rotation shaft (S102);

Third controllable brake device (BK103): which is constituted by a brake device controlled by a manual force, mechanical force, hydraulic force, pneumatic force, or electromagnetic force, and having two controllable action sides for controlling a brake locking state to provide engagement or releasing separation, wherein one of the action sides is connected to the rotation shaft (S101), and the other action side is fixed in the housing (H100);

Dual-drive electric machine (EM100): which is constituted by a DC or AC, brush or brushless, synchronous or non-synchronous dual-drive electric machine having an inner rotation part (EM101) and an outer rotation part (EM102), and installed with end covers, bearings and related electric conduction devices used to supply electric energy, wherein the inner rotation part (EM101) and the outer rotation part (EM102) are coaxially rotated, the inner rotation part (EM101) is combined with the first rotation shaft (S101), and the outer rotation part e(EM102) is combined with the outer annular wheel (W102);

First rotation shaft (S101): which is shared by the sun wheel (W101) of the planetary gear set (DG101) and the inner rotation part (EM101) of the dual-drive electric machine (EM100) to serve as the first output/input end, and provided for connecting to an action side of the controllable brake device (BK103) while the other action side of the controllable brake device (BK103) is fixed in the housing (H100);

The outer annular wheel (W102) of the planetary gear set (DG101): which is combined with the outer rotation part (EM102) and combined with the sleeve type rotation shaft (AS101), wherein the sleeve type rotation shaft (AS101) is rotatably sleeved on the first rotation shaft (S101) to serve as the second output/input end, and the planetary wheel (W103) of the planetary gear set (DG101) is provided for linking the rocker arm (A101) and driving the second rotation shaft (S102) to serve as the third output/input end. The operations of the dual-drive electric machine having a controllable planetary gear set shown in FIG. 3 include one or more than one of the following functions:

When the controllable brake device (BK103) is controlled to be in the releasing state, and the dual-drive electric machine (EM100) is not operated as an electric machine function, the transmission relation between the first rotation shaft (S101), the sleeve type rotation shaft (AS101) and the second rotation shaft (S102) are in the releasing state allowing idle rotation;

When the third controllable brake device (BK103) is controlled to be in the releasing state, and the dual-drive electric machine (EM100) is operated as an electric machine, the corresponding power generator function or motor function are correspondingly performed between the inner rotation part (EM101) and the outer rotation part (EM102) according to the damping of an external load or the rotation torque, the rotation speed and the rotation direction of the externally input rotary kinetic energy being sustained by the first rotation shaft (S101), the second rotation shaft (S102), and the sleeve type rotation shaft (AS101);

When the third controllable brake device (BK103) is controlled to be in the brake locking state, and the dual-drive electric machine (EM100) is not operated as an electric machine, the transmission relation between the sleeve type rotation shaft (AS101) and the second rotation shaft (S102) is in a connecting relation allowing for transmission;

When the controllable brake device (BK103) is controlled to be in the brake locking state, and the dual-drive electric machine (EM100) is operated as an electric machine, interaction between the inner rotation part (EM101) and the outer rotation part (EM102) provides a power generator function or motor function for performing interactive operations according to the damping of the external load or the externally input rotary kinetic energy sustained by the sleeve type rotation shaft (AS101) and the second rotation shaft (S102).

The interactive operations performed by the dual-drive electric machine (EM100) may include receiving the driving control of externally input electric energy to operate as a motor for individually driving the load, or working with the externally inputted rotary kinetic energy for commonly driving the load;

The interactive operations performed by the dual-drive electric machine (EM100) may also include being driven by externally input rotary kinetic energy or load inertia kinetic energy for providing a power generator function, so as to output the electric energy to drive an external electric load or charge an external electric energy storing device.

Figure 4:
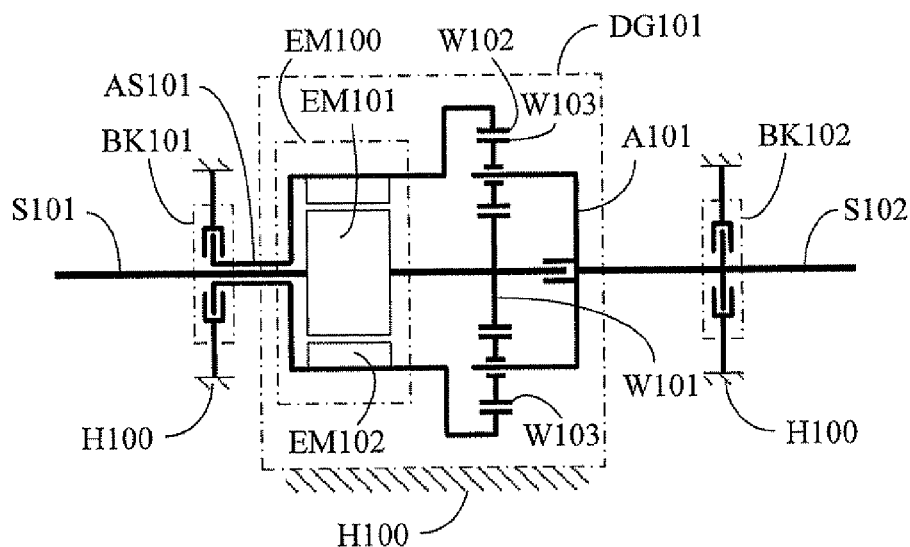
FIG. 4 is a schematic view showing a fourth preferred embodiment in which a controllable brake device (BK102) is further installed between the rotation shaft (S102) and the housing (H100) of the preferred embodiment shown in FIG. 1.

As shown in FIG. 4, the second controllable brake device (BK102) may be further installed between the second rotation shaft (S102) and the housing (H100) shown in FIG. 1.

In the clutch device of FIG. 4, the rotation shaft (S101) is shared by the sun wheel (W101) of the planetary gear set (DG101) and the inner rotation part (EM101) of the dual-drive electric machine (EM100) serves as a first output/input end, wherein the outer annular wheel (W102) is combined with the outer rotation part (EM102) and combined with the sleeve type rotation shaft (AS101), the sleeve type rotation shaft (AS101) is rotatably sleeved on the rotation shaft (S101) to serve as a second output/input end, the sleeve type rotation shaft (AS101) is connected to an action side of the first controllable brake device (BK101) while the other action side of the first controllable brake device (BK101) is fixed in the housing (H100), the planetary gear set (DG101) is also fixed in the housing (H100), the rocker arm (A101) is linked by the planetary wheel (W103) of the planetary gear set (DG101) and provided for driving the rotation shaft (S102) to serve as a third output/input end, and the rotation shaft (S102) or the rocker arm (A101) is connected to an action side of the controllable brake device (BK102) while the other action side of the controllable brake device (BK102) is fixed in the housing (H100). The clutch device of this embodiment thus mainly consists of:

Planetary gear set (DG101): which is constituted by a sun wheel (W101), an outer annular wheel (W102) and at least one planetary wheel (W103) in the form of gears engaging with each other or friction wheels mutually performing friction transmission to provide a planetary gear set function, and further structured by the first rotation shaft (S101), the second rotation shaft (S102), the rocker arm (A101), the sleeve type rotation shaft (AS101) and a bearing installed within a shell combined with the housing (H100);

Rocker arm (A101): having one end provided for allowing the planetary wheel (W103) to rotate and link, and the other end being connected to the second rotation shaft (S102);

First controllable brake device (BK101): which is constituted by a brake device controlled by manual force, mechanical force, hydraulic force, pneumatic force, electromagnetic force, and having two controllable action sides for engagement or releasing operations, wherein one of the action sides is connected to the sleeve type rotation shaft (AS101), and the other action side is fixed in the housing (H100);

Second controllable brake device (BK102): which is constituted by a brake device controlled by manual force, mechanical force, hydraulic force, pneumatic force, or electromagnetic force, and having two controllable action sides for controlling engagement or releasing operations, wherein one of the action sides is connected to the second rotation shaft (S102) or the rocker arm (A101), and the other action side is fixed in the housing (H100);

Dual-drive electric machine (EM100): which is constituted by a DC or AC, brush or brushless, synchronous or non-synchronous dual-drive electric machine, having an inner rotation part (EM101) and an outer rotation part (EM102), and installed with end covers, bearings and related electric conduction devices used to supply electric energy, the inner rotation part (EM101) and the outer rotation part (EM102) being coaxially rotated, wherein the inner rotation part of electric machine (EM101) is combined with the first rotation shaft (S101), and the outer rotation part of electric machine (EM102) is combined with the outer annular wheel (W102);

First rotation shaft (S101): which is shared by the sun wheel (W101) of the planetary gear set (DG101) and the inner rotation part (EM101) of the dual-drive electric machine (EM100) to serve as a first output/input end, wherein the rocker arm (A101) linked by the planetary wheel (W103) of the planetary gear set (DG101) and combined with the second rotation shaft (S102) serves as second output/input end, the outer annular wheel (W102) is combined with the outer rotation part of electric machine (EM102) and combined with the sleeve type rotation shaft (AS101), the sleeve type rotation shaft (AS101) is rotatably sleeved on the first rotation shaft (S101) to serve as a second output/input end, the sleeve type rotation shaft (AS101) is connected to an action side of the controllable brake device (BK101) while the other action side of the controllable brake device (BK101) is fixed in the housing (H100), the rocker arm (A101) linked by the planetary wheel (W103) of the planetary gear set (DG101) is provided for driving the second rotation shaft (S102) to serve as a third output/input end, and the second rotation shaft (S102) or the rocker arm (A101) is connected to an action side of the second controllable brake device (BK102) while the other action side of the second controllable brake device (BK102) is fixed in the housing (H100).

According to the embodiment shown in FIG. 4, the operations of the dual-drive electric machine having a controllable planetary gear set include one or more than one of following functions:

When the first controllable brake device (BK101) and the second controllable brake device (BK102) are both controlled to be in the releasing state, and the dual-drive electric machine (EM100) is not operated as an electric machine, the transmission relations between the first rotation shaft (S101) and the second rotation shaft (S102) and the sleeve type rotation shaft (AS101) are in the releasing state allowing idle rotation;

When the first controllable brake device (BK101) and the second controllable brake device (BK102) are both controlled to be in the releasing state, and the dual-drive electric machine (EM100) is operated as an electric machine, the corresponding power generator function or motor function are correspondingly performed between the inner rotation part (EM101) and the outer rotation part (EM102) according to the damping of the external load or the rotation torque, the rotation speed and the rotation direction of the externally input rotary kinetic energy being sustained by the first rotation shaft (S101), the second rotation shaft (S102) and the sleeve type rotation shaft (AS101);

When the first controllable brake device (BK101) is controlled to be in the brake locking state, the second controllable brake device (BK102) is controlled to be in the releasing state, and the dual-drive electric machine (EM100) is not operated as an electric machine, the transmission relation between the first rotation shaft (S101) and the second rotation shaft (S102) is in a connecting relation allowing for transmission;

When the first controllable brake device (BK101) is controlled to be in the brake locking state, the second controllable brake device (BK102) is controlled to be in the releasing state, and the dual-drive electric machine (EM100) is operated as an electric machine, interaction between the inner rotation part (EM101) and the outer rotation part (EM102) provides the power generator function or the motor function for performing corresponding interactive operations with the damping of the external load or the externally input rotary kinetic energy sustained by the first rotation shaft (S101) and the second rotation shaft (S102);

When the first controllable brake device (BK101) is controlled to be in the releasing state and the second controllable brake device (BK102) is controlled to be in the brake locking state, and the dual-drive electric machine (EM100) is not operated as an electric machine, the transmission relation between the first rotation shaft (S101) and the sleeve type rotation shaft (AS101) is in a connecting relation allowing for transmission;

When the first controllable brake device (BK101) is controlled to be in the releasing state, the second controllable brake device (BK102) is controlled to be in the brake locking state, and the dual-drive electric machine (EM100) is operated as an electric machine, interaction between the inner rotation part (EM101) and the outer rotation part (EM102) provides the power generator function or the motor function for performing corresponding interactive operations with the damping of external load or the externally input rotary kinetic energy sustained by the first rotation shaft (S101) and the sleeve type rotation shaft (AS101); and When the first controllable brake device (BK101) and the second controllable brake device (BK102) are both controlled to be in the brake locking state, the relations between the rotation shaft (S101), the rotation shaft (S102) and the sleeve type rotation shaft (AS101) are all in the brake locking state.

The interactive operations performed by the dual-drive electric machine (EM100) may include receiving the driving control of externally input electric energy to operate as a motor for individually driving the load, or working with the externally input rotary kinetic energy for commonly driving the load.

The interactive operations performed by the dual-drive electric machine (EM100) may also include receiving the driving of the externally input rotary kinetic energy or the load inertia kinetic energy for operation as a power generator so as to output electric energy to drive an external electric load or charge an external electric energy storing device.

Figure 5:
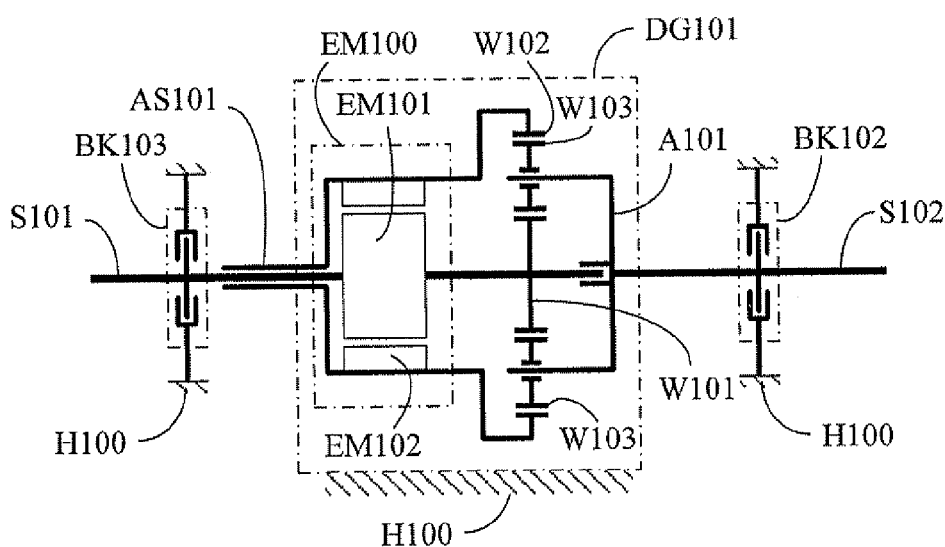
FIG. 5 is a schematic view showing a fifth preferred embodiment in which a controllable brake device (BK103) is further installed between the rotation shaft (S101) and the housing (H100) of the embodiment shown in FIG. 2.

As shown in FIG. 5, the third controllable brake device (BK103) is further installed between the rotation shaft (S101) and the housing (H100) of the clutch device shown in FIG. 2.

In the clutch device of FIG. 5, the first rotation shaft (S101) is shared by the sun wheel (W101) of the planetary gear set (DG101) and the inner rotation part (EM101) of the dual-drive electric machine (EM100) serves as a first output/input end, and is provided for connecting to an action side of the third controllable brake device (BK103) while the other action side of the third controllable brake device (BK103) is fixed in the housing (H100), the planetary gear set (DG101) is also fixed in the housing (H100), wherein the outer annular wheel (W102) of the planetary gear set (DG101) is combined with the outer rotation part (EM102) and with the sleeve type rotation shaft (AS101), the sleeve type rotation shaft (AS101) is rotatably sleeved on the first rotation shaft (S101) to serve as a second output/input end, the planetary wheel (W103) of the planetary gear set (DG101) is provided for linking the rocker arm (A101) and driving the second rotation shaft (S102) to serve as a third output/input end, and the second rotation shaft (S102) or the rocker arm (A101) is connected to an action side of the controllable brake device (BK102) while the other action side of the controllable brake device (BK102)

is fixed in the housing (H100) The clutch device of this embodiment mainly consists of:

Planetary gear set (DG101): which is constituted by a sun wheel (W101), an outer annular wheel (W102), and at least one planetary wheel (W103) in the form of gears engaging with each other or friction wheels mutually performing friction transmission to form a planetary gear set function, and further structured by the first rotation shaft (S101), the second rotation shaft (S102), the rocker arm (A101), the sleeve type rotation shaft (AS101) and a bearing installed within a shell combined with the housing (H100);

Rocker arm (A101): having one end provided for allowing the planetary wheel (W103) to rotate and link, and the other end being connected to the second rotation shaft (S102);

Second controllable brake device (BK102): which is constituted by a brake device controlled by manual force, mechanical force, hydraulic force, pneumatic force, or electromagnetic force, and having two controllable action sides for providing engagement or releasing functions, wherein one of the action sides is connected to the rotation shaft (S102) or the rocker arm (A101), and the other action side is fixed in the housing (H100);

Third controllable brake device (BK103): which is constituted by a brake device controlled by manual force, mechanical force, hydraulic force, pneumatic force, or electromagnetic force, and having two controllable action sides for providing engagement or releasing functions, wherein one of the action sides is connected to the rotation shaft (S101), and the other action side is fixed in the housing (H100);

Dual-drive electric machine (EM100): which is constituted by a DC or AC, brush or brushless, synchronous or non-synchronous dual-drive electric machine, having an inner rotation part (EM101) and an outer rotation part (EM102), and installed with end covers, bearings and related electric conduction devices used to supply electric energy, the inner rotation part (EM101) and the outer rotation part (EM102) are coaxially rotated, wherein the inner rotation part (EM101) is combined with the first rotation shaft (S101), and the outer rotation part of electric machine (EM102) is combined with the outer annular wheel (W102);

The first rotation shaft (S101): which is shared by the sun wheel (W101) of the planetary gear set (DG101) and the inner rotation part (EM101) of the dual-drive electric machine (EM100) and serves as a first output/input end, and is further provided for connecting to an action side of the third controllable brake device (BK103) while the other action side of the third controllable brake device (BK103) is fixed in the housing (H100); wherein the rocker arm (A101) linked by the planetary wheel (W103) of the planetary gear set (DG101) is combined with the second rotation shaft (S102) to serve as a second output/input end, the second rotation shaft (S102) or the rocker arm (A101) is connected to an action side of the controllable brake device (BK102) while the other action side of the controllable brake device (BK102) is fixed in the housing (H100), the outer annular wheel (W102) is combined with the outer rotation part (EM102) and combined with the sleeve type rotation shaft (AS101), and the sleeve type rotation shaft (AS101) is rotatably sleeved on the first rotation shaft (S101) to serve as a third output/input end.

The operations of the dual-drive electric machine having a controllable planetary gear set as shown in FIG. 5 include one or more than one of following functions:

When the second controllable brake device (BK102) and the third controllable brake device (BK103) are both controlled to be in the releasing state, and the dual-drive electric machine (EM100) is not operated as an electric machine, the transmission relations between the first rotation shaft (S101), the second rotation shaft (S102), and the sleeve type rotation shaft (AS101) are in the releasing state allowing idle rotation;

When the second controllable brake device (BK102) and the third controllable brake device (BK103) are both controlled to be in the releasing state, and the dual-drive electric machine (EM100) is operated as an electric machine, the corresponding interactive power generator function or motor function are correspondingly performed between the inner rotation part (EM101) and the outer rotation part (EM102) according to the damping of the external load or the rotation torque, the rotation speed and the rotation direction of the externally input rotary kinetic energy being sustained by the first rotation shaft (S101), the second rotation shaft (S102) and the sleeve type rotation shaft (AS101);

When the third controllable brake device (BK103) is controlled to be in the brake locking state and the second controllable brake device (BK102) is controlled to be in the releasing state, and the dual-drive electric machine (EM100) is not operated as an electric machine, the transmission relation between the sleeve type rotation shaft (AS101) and the second rotation shaft (S102) is in a connecting relation allowing for transmission;

When the third controllable brake device (BK103) is controlled to be in the brake locking state and the second controllable brake device (BK102) is controlled to be in the releasing state, and the dual-drive electric machine (EM100) is operated with an electric machine function, the inner rotation part (EM101) and the outer rotation part (EM102) provide a power generator or motor function for performing corresponding interactive operations with the damping of the external load or externally input rotary kinetic energy sustained by the sleeve type rotation shaft (AS101) and the second rotation shaft (S102);

When the third controllable brake device (BK103) is controlled to be in the releasing state and the second controllable brake device (BK102) is controlled to be in the brake locking state, and the dual-drive electric machine (EM100) is not operated as an electric machine, the transmission relation between the first rotation shaft (S101) and the sleeve type rotation shaft (AS101) is in a connecting relation allowing for transmission;

When the third controllable brake device (BK103) is controlled to be in the releasing state and the second controllable brake device (BK102) is controlled to be in the brake locking state, and the dual-drive electric machine (EM100) is operated as an electric machine, the inner rotation part (EM101) and the outer rotation part (EM102) interact to provide a power generator or motor function for performing corresponding interactive operations with the damping of the external load or externally input rotary kinetic energy sustained by the first rotation shaft (S101) and the sleeve type rotation shaft (AS101);

When the first controllable brake device (BK101) and the second controllable brake device (BK102) are both controlled to be in the brake locking state, the relations between the first rotation shaft (S101), the second rotation shaft (S102) and the sleeve type rotation shaft (AS101) are all in the brake locking state;

The interactive operations performed by the dual-drive electric machine (EM100) may include receiving the driving control of externally input electric energy to operate as a motor for individually driving the load, or working with the externally input rotary kinetic energy for commonly driving the load;

The interactive operations performed by the dual-drive electric machine (EM100) may also include receiving the driving of the externally input rotary kinetic energy or load inertia kinetic energy to provide a power generator function, so as to output the electric energy to drive an external electric load or charge an external electric energy storing device.

Figure 6:
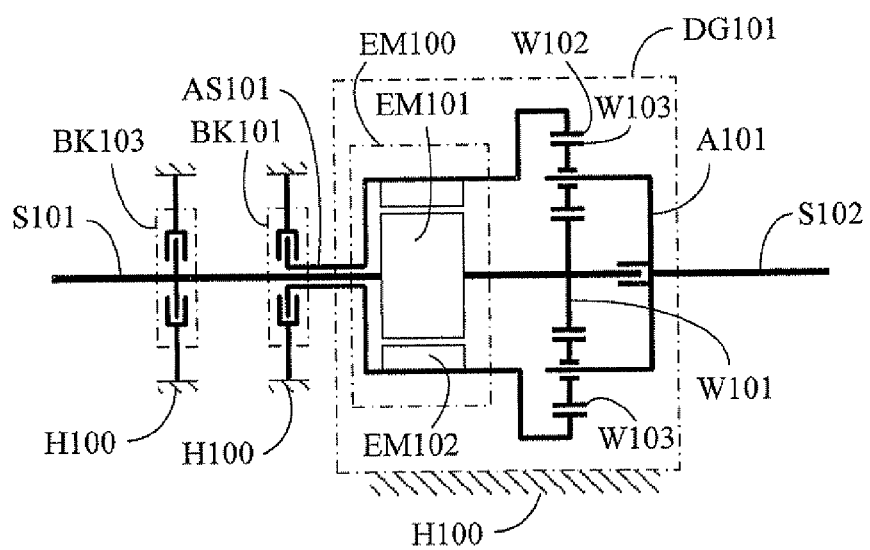
FIG. 6 is a schematic view showing a sixth preferred embodiment in which a controllable brake device (BK101) is further installed between the sleeve type rotation shaft (AS101) and the housing (H100) of the embodiment shown in FIG. 3.

As shown in FIG. 6, the first controllable brake device (BK101) is further installed between the sleeve type rotation shaft (AS101) and the housing (H100) shown in FIG. 3.

In the clutch device of FIG. 6, the first rotation shaft (S101) is shared by the sun wheel (W101) of the planetary gear set (DG101), and the inner rotation part (EM101) of the dual-drive electric machine (EM100) serves as a first output/input end and is provided for connecting to an action side of the third controllable brake device (BK103) while the other action side of the third controllable brake device (BK103) is fixed in the housing (H100), wherein the outer annular wheel (W102) of the planetary gear set (DG101) is combined with the outer rotation part (EM102) and combined with the sleeve type rotation shaft (AS101), the sleeve type rotation shaft (AS101) is rotatably sleeved on the first rotation shaft (S101) to serve as a second output/input end, the sleeve type rotation shaft (AS101) is connected to an action side of the first controllable brake device (BK101) while the other action side of the first controllable brake device (BK101) is fixed in the housing (H100), the shell of the planetary gear set (DG101) also is fixed in the housing (H100), and the planetary wheel (W103) of the planetary gear set (DG101) is provided for linking the rocker arm (A101) and driving the second rotation shaft (S102) to serve as a third output/input end The clutch device of this embodiment mainly consists of:

Planetary gear set (DG101): which is constituted by a sun wheel (W101), an outer annular wheel (W102) and at least one planetary wheel (W103) formed by gears engaging with each other, or through friction wheels mutually performing friction transmission to provide the planetary gear set function, and further structured by the first rotation shaft (S101), the second rotation shaft (S102), the rocker arm (A101), the sleeve type rotation shaft (AS101) and a bearing, as well as being installed within a shell combined in the housing (H100);

Rocker arm (A101): having one end provided for allowing the planetary wheel (W103) to rotate and link, and the other end being connected to the second rotation shaft (S102);

First controllable brake device (BK101): which is constituted by a brake device controlled by manual force, mechanical force, hydraulic force, pneumatic force, or electromagnetic force, and having two controllable action sides for the operations of engagement or releasing, wherein one of the action sides is connected to the sleeve type rotation shaft (AS101), and the other action side is fixed in the housing (H100);

Third controllable brake device (BK103): which is constituted by a brake device controlled by manual force, mechanical force, hydraulic force, pneumatic force, or electromagnetic force, and having two controllable action sides for the operations of engagement or releasing, wherein one of the action sides is connected to the first rotation shaft (S101), and the other action side is fixed in the housing (H100);

Dual-drive electric machine (EM100): which is constituted by a DC or AC, brush or brushless, synchronous or non-synchronous dual-drive electric machine, having an inner rotation part (EM101) and an outer rotation part (EM102), and installed with end covers, bearings and related electric conduction devices used to supply electric energy, the inner rotation part (EM101) and the outer rotation part (EM102) being coaxially rotated, wherein the inner rotation part (EM101) is combined with the first rotation shaft (S101), and the outer rotation part (EM102) is combined with the outer annular wheel (W102);

The first rotation shaft (S101): which is shared by the sun wheel (W101) of the planetary gear set (DG101) and the inner rotation part (EM101) of the dual-drive electric machine (EM100) and serves as a first output/input end, and is provided for connecting to an action side of the third controllable brake device (BK103) while the other action side of the third controllable brake device (BK103) is fixed in the housing (H100);

The outer annular wheel (W102) of the planetary gear set (DG101) is combined with the outer rotation part (EM102) and combined with the sleeve type rotation shaft (AS101), the sleeve type rotation shaft (AS101) being rotatably sleeved on the first rotation shaft (S101) to serve as a second output/input end, the sleeve type rotation shaft (AS101) being connected to an action side of the first controllable brake device (BK101) while the other action side of the first controllable brake device (BK101) is fixed in the housing (H100), and the planetary wheel (W103) of the planetary gear set (DG101) is provided for linking the rocker arm (A101) and driving the second rotation shaft (S102) to serve as a third output/input end.

The operations of the dual-drive electric machine having a controllable planetary gear set as shown in FIG. 6 include one or more than one of following functions:

When the first controllable brake device (BK101) and the third controllable brake device (BK103) are both controlled to be in the releasing state, and the dual-drive electric machine (EM100) is not operated as an electric machine, the transmission relations between the first rotation shaft (S101), the second rotation shaft (S102) and the sleeve type rotation shaft (AS101) are in the releasing state allowing idle rotation;

When the first controllable brake device (BK101) and the third controllable brake device (BK103) are both controlled to be in the releasing state, and the dual-drive electric machine (EM100) is operated as an electric machine, the corresponding interactive operation of the power generator function or the motor function are correspondingly performed between the inner rotation part (EM101) and the outer rotation part (EM102) according to damping of the external load or the rotation torque, the rotation speed and the rotation direction of the externally input rotary kinetic energy being sustained by the first rotation shaft (S101), the rotation shaft (S102) and the sleeve type rotation shaft (AS101);

When the first controllable brake device (BK101) is controlled to be in the brake locking state and the third controllable brake device (BK103) is controlled to be in the releasing state, and the dual-drive electric machine (EM100) is not operated as an electric machine, the transmission relation between the first rotation shaft (S101) and the second rotation shaft (S102) is in a connecting relation allowing for transmission;

When the first controllable brake device (BK101) is controlled to be in the brake locking state and the third controllable brake device (BK103) is controlled to be in the releasing state, and the dual-drive electric machine (EM100) is operated as an electric machine, the inner rotation part (EM101) and the outer rotation part (EM102) are operated as a power generator or motor for performing corresponding interactive operations with the damping of external load or the externally input rotary kinetic energy sustained by the first rotation shaft (S101) and second rotation shaft (S102);

When the first controllable brake device (BK101) is controlled to be in the releasing state and the third controllable brake device (BK103) is controlled to be in the brake locking state, and the dual-drive electric machine (EM100) is not operated as an electric machine, the transmission relation between the second rotation shaft (S102) and the sleeve type rotation shaft (AS101) is in a connecting relation allowing for transmission;

When the first controllable brake device (BK101) is controlled to be in the releasing state and the third controllable brake device (BK103) is controlled to be in the brake locking state, and the dual-drive electric machine (EM100) is operated as an electric machine, the inner rotation part (EM101) and the outer rotation part (EM102) are operated as a power generator or motor for performing corresponding interactive operations with the damping of the external load or externally input rotary kinetic energy sustained by the second rotation shaft (S102) and the sleeve type rotation shaft (AS101);

When the first controllable brake device (BK101) and the second controllable brake device (BK102) are both controlled to be in the brake locking state, the relations between the first rotation shaft (S101), the second rotation shaft (S102) and the sleeve type rotation shaft (AS101) are all in the brake locking state.

The interactive operations performed by the dual-drive electric machine (EM100) include receiving the driving control of externally input electric energy to operate as a motor for individually driving the load, or working with the externally input rotary kinetic energy for commonly driving the load;

The interactive operations performed by the dual-drive electric machine (EM100) also include receiving the driving of the externally input rotary kinetic energy or load inertia kinetic energy for being operated as a power generator so as to output the electric energy to drive an external electric load or charge an external electric energy storing device.

Figure 7:
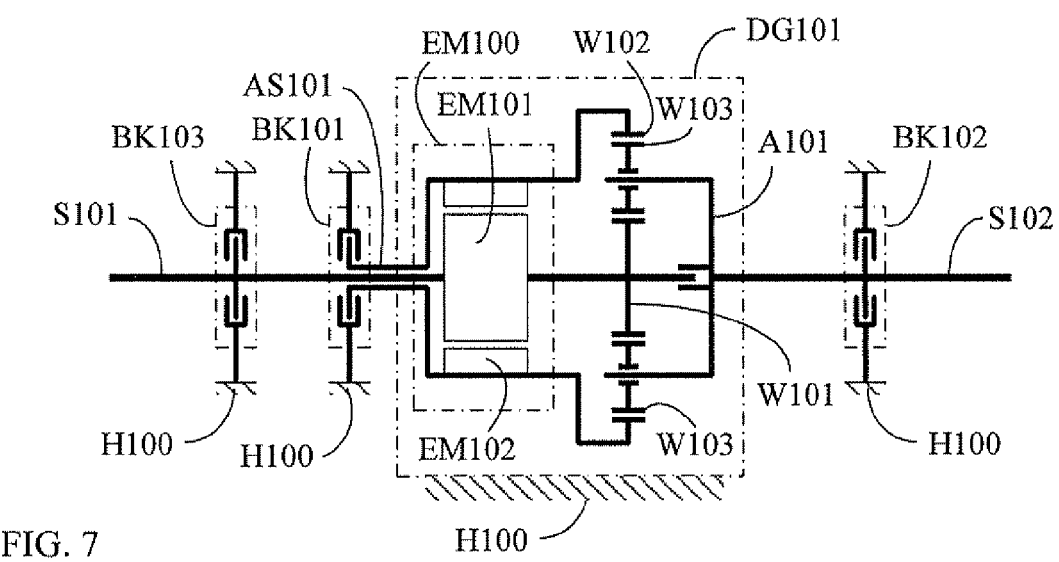
FIG. 7 is a schematic view showing the clutch device of a seventh preferred embodiment of the present invention.

As shown in FIG. 7, the first rotation shaft (S101) is shared by the sun wheel (W101) of the planetary gear set (DG101) and the inner rotation part (EM101) of the dual-drive electric machine (EM100) to serve as a first output/input end and connect to an action side of the controllable brake device (BK103) while the other action side of the controllable brake device (BK103) is fixed in the housing (H100), the outer annular wheel (W102) of the planetary gear set (DG101) being combined with the outer rotation part (EM102) and with the sleeve type rotation shaft (AS101), the sleeve type rotation shaft (AS101) being rotatably sleeved on the first rotation shaft (S101) to serve as a first output/input end, the sleeve type rotation shaft (AS101) being connected to an action side of the first controllable brake device (BK101) while the other action side of the first controllable brake device (BK101) is fixed in the housing (H100), the planetary gear set (DG101) also being fixed in the housing (H100), the planetary wheel (W103) of the planetary gear set (DG101) being provided for linking the rocker arm (A101) and driving the rotation shaft (S102) to serve as a second output/input end, and the second rotation shaft (S102) or the rocker arm (A101) being connected to an action side of the controllable brake device (BK102) while the other action side of the controllable brake device (BK102) is fixed in the housing (H100).

In the clutch device of FIG. 7, the first rotation shaft (S101) is shared by the sun wheel (W101) of the planetary gear set (DG101) and the inner rotation part (EM101) of the dual-drive electric machine (EM100) to serve as the first output/input end and is provided for connecting to an action side of the third controllable brake device (BK103) while the other action side of the third controllable brake device (BK103) is fixed in the housing (H100), wherein the outer annular wheel (W102) of the planetary gear set (DG101) is combined with the outer rotation part (EM102) and the sleeve type rotation shaft (AS101), the sleeve type rotation shaft (AS101) is rotatably sleeved on the first rotation shaft (S101) to serve as the first output/input end, the sleeve type rotation shaft (AS101) is connected to an action side of the first controllable brake device (BK101) while the other action side of the first controllable brake device (BK101) is fixed in the housing (H100), the planetary gear set (DG101) is also fixed in the housing (H100), the planetary wheel (W103) of the planetary gear set (DG101) is provided for linking the rocker arm (A101) and driving the second rotation shaft (S102) to serve as a third output/input end, and the second rotation shaft (S102) or the rocker arm (A101) is connected to an action side of the second controllable brake device (BK102) while the other action side of the controllable brake device (BK102) is fixed in the housing (H100) The clutch device of this embodiment mainly consists of:

Planetary gear set (DG101): which is constituted by a sun wheel (W101), an outer annular wheel (W102), and at least one planetary wheel (W103) in the form of gears engaging with each other, or friction wheels mutually performing friction transmission to provide the planetary gear set function, and further structured by the first rotation shaft (S101), the second rotation shaft (S102), the rocker arm (A101), the sleeve type rotation shaft (AS101) and a bearing installed within a shell for being combined in the housing (H100);

Rocker arm (A101): having one end provided for allowing the planetary wheel (W103) to rotate and link, and the other end being connected to the rotation shaft (S102);

First controllable brake device (BK101): which is constituted by a brake device controlled by manual force, mechanical force, hydraulic force, pneumatic force, or electromagnetic force, and having two controllable action sides for engagement or releasing operations, wherein one of the action sides is connected to the sleeve type rotation shaft (AS101), and the other action side is fixed in the housing (H100);

Second controllable brake device (BK102): which is constituted by a brake device controlled by manual force, mechanical force, hydraulic force, pneumatic force, or electromagnetic force, and having two controllable action sides for engagement or releasing operations, wherein one of the action sides is connected to the second rotation shaft (S102) or the rocker arm (A101), and the other action side is fixed in the housing (H100);

Third controllable brake device (BK103): which is constituted by a brake device controlled by manual force, mechanical force, hydraulic force, pneumatic force, or electromagnetic force, and having two controllable action sides for engagement or releasing operations, wherein one of the action sides is connected to the first rotation shaft (S101), and the other action side is fixed in the housing (H100);

Dual-drive electric machine (EM100): which is constituted by a DC or AC, brush or brushless, synchronous or non-synchronous dual-drive electric machine, having an inner rotation part (EM101) and an outer rotation part (EM102), and installed with end covers, bearings and related electric conduction devices used to conduct electric energy, the inner rotation part (EM101) and the outer rotation part (EM102) being coaxially rotated, wherein the inner rotation part (EM101) is combined with the first rotation shaft (S101), and the outer rotation part (EM102) is combined with the outer annular wheel (W102);

The first rotation shaft (S101): which is shared by the sun wheel (W101) of the planetary gear set (DG101) and the inner rotation part (EM101) of the dual-drive electric machine (EM100) to serve as a first output/input end, and is provided for connecting to an action side of the third controllable brake device (BK103) while the other action side of the third controllable brake device (BK103) is fixed in the housing (H100);

The outer annular wheel (W102) of the planetary gear set (DG101) is combined with the outer rotation part (EM102) and with the sleeve type rotation shaft (AS101), the sleeve type rotation shaft (AS101) being rotatably sleeved on the first rotation shaft (S101) to serve as second output/input end and connected to an action side of the first controllable brake device (BK101) while the other action side of the first controllable brake device (BK101) is fixed in the housing (H100), the planetary wheel (W103) of the planetary gear set (DG101) being provided for linking the rocker arm (A101) and driving the second rotation shaft (S102) to serve as a third output/input end, and the second rotation shaft (S102) or the rocker arm (A101) being connected to an action side of the second controllable brake device (BK102) while the other action side of the second controllable brake device (BK102) is fixed in the housing (H100).

The operations of the dual-drive electric machine having a controllable planetary gear set as shown in FIG. 7 include one or more than one of following functions:

When the first controllable brake device (BK101), the second controllable brake device (BK102), and the third controllable brake device (BK103) are all controlled to be in the releasing state, and the dual-drive electric machine (EM100) is not operated as an electric machine, the transmission relations between the first rotation shaft (S101), the second rotation shaft (S102) and the sleeve type rotation shaft (AS101) are in the releasing state allowing idle rotation;

When the first controllable brake device (BK101), the second controllable brake device (BK102) and the third controllable brake device (BK103) are all controlled to be in the releasing state, and the dual-drive electric machine (EM100) is operated as an electric machine, the corresponding interactive operations of the power generator function or the motor function are correspondingly performed between the inner rotation part (EM101) and the outer rotation part (EM102) according to the damping of the external load or the rotation torque, the rotation speed and the rotation direction of the externally input rotary kinetic energy being sustained by the first rotation shaft (S101), the second rotation shaft (S102) and the sleeve type rotation shaft (AS101);

When the first controllable brake device (BK101) is controlled to be in the brake locking state, the second controllable brake device (BK102) and the third controllable brake device (BK103) are controlled to be in the releasing state, and the dual-drive electric machine (EM100) is not operated as an electric machine, the transmission relation between the first rotation shaft (S101) and the second rotation shaft (S102) are in a connecting relation allowing for transmission;

When the first controllable brake device (BK101) is controlled to be in the brake locking state, the second controllable brake device (BK102) and the third controllable brake device (BK103) are controlled to be in the releasing state, and the dual-drive electric machine (EM100) is operated as an electric machine, the inner rotation part (EM101) and the outer rotation part (EM102) are operated as a power generator or motor for performing corresponding interactive operations with the damping of external load or the externally inputted rotary kinetic energy sustained by the first rotation shaft (S101) and the second rotation shaft (S102);

When the second controllable brake device (BK102) is controlled to be in the brake locking state, the first controllable brake device (BK101) and the third controllable brake device (BK103) are controlled to be in the releasing state, and the dual-drive electric machine (EM100) is not operated as an electric machine, the transmission relation between the first rotation shaft (S101) and the sleeve type rotation shaft (AS101) is in a connecting relation allowing for transmission;

When the second controllable brake device (BK102) is controlled to be in the brake locking state, the first controllable brake device (BK101) and the third controllable brake device (BK103) are controlled to be in the releasing state, and the dual-drive electric machine (EM100) is operated as an electric machine, the inner rotation part (EM101) and the outer rotation part (EM102) are operated as a power generator or motor for performing corresponding interactive operations with the damping of external load or the externally input rotary kinetic energy sustained by the first rotation shaft (S101) and the sleeve type rotation shaft (AS101);

When the third controllable brake device (BK103) is controlled to be in the brake locking state, the first controllable brake device (BK101) and the second controllable brake device (BK102) are controlled to be in the releasing state, and the dual-drive electric machine (EM100) is not operated as an electric machine, the transmission relation between the second rotation shaft (S102) and the sleeve type rotation shaft (AS101) is in a connecting relation allowing for transmission;

When the third controllable brake device (BK103) is controlled to be in the brake locking state, the first controllable brake device (BK101) and the second controllable brake device (BK102) are controlled to be in the releasing state, and the dual-drive electric machine (EM100) is operated as an electric machine, the inner rotation part (EM101) and the outer rotation part (EM102) are operated as a power generator or motor for performing corresponding interactive operations with the damping of external load or the externally input rotary kinetic energy sustained by the second rotation shaft (S102) and the sleeve type rotation shaft (AS101);

When two or all of the first controllable brake device (BK101), the second controllable brake device (BK102) and the third controllable brake device (BK103) are controlled to be in the brake locking state, the relations between the first rotation shaft (S101), the second rotation shaft (S102) and the sleeve type rotation shaft (AS101) are all in the brake locking state.

The interactive operations performed by the dual-drive electric machine (EM100) include receiving the driving control of externally input electric energy to operate as a motor for individually driving the load, or working with the externally input rotary kinetic energy for commonly driving the load.

The interactive operations performed by the dual-drive electric machine (EM100) include receiving the driving of the externally input rotary kinetic energy or load inertia kinetic energy for being operated as a power generator so as to output electric energy to drive an external electric load or charge an external electric energy storing device.

The dual-drive electric machine having a controllable planetary gear set of the present invention can be applied to various load devices which require mechanical output for driving, such as a ground vehicle, rail vehicle, agriculture machinery or vehicle, excavator, bulldozer, construction vehicle, transportation vehicle, garbage truck, hoisting machinery, lifting machinery, forklift machinery, surface or underwater boat, aircraft, industrial machinery, tool machine, power device, hand-operated tool, robot or mechanical arm, gardening power tool, and domestic electric equipment.

Sources of externally input rotary kinetic energy for the dual-drive electric machine having controllable planetary gear set of the present invention include an internal combustion engine, external combustion engine, Sterling engine, steam engine, electric engine, hydraulic engine, pneumatic engine, wind-driven blade device, flow-driven blade device, vapor-driven blade device, and human or animal forces.

The invention claimed is:

1. A dual-drive electric machine and planetary gear set assembly, comprising:
   an electric machine (EM100) having an inner rotation part (EM101) and an outer rotation part (EM102);
   a planetary gear set (DG101) having a sun wheel (W101), an outer planetary wheel (W102), a rocker arm (A101) on which is rotatably mounted at least one planetary wheel (W103) rotatably engaged with the sun wheel (W101) and the outer planetary wheel (W102), and a sleeve type rotation shaft combined with the outer planetary wheel (W102);
   a first rotation shaft (S101);
   a second rotation shaft (S102);
   at least one controllable brake device (BK101, BK102, and/or BK103); and
   a housing (H100) of the planetary gear set (DG101), wherein:
   the inner rotation part (EM101) is combined with the first rotation shaft (S101), and the first rotation shaft (S101) is combined with the sun wheel (W101),
   the rocker arm (A101) is combined with the second rotation shaft (S102),
   the outer rotation part (EM102) is combined with the outer annular wheel (W102) or sleeve type rotation shaft (AS101),
   the first rotation shaft (S101) serves as a first output/input end of the dual-drive electric machine and planetary gear set assembly,
   the second rotation shaft (S102) serves as a second output/input end of the dual-drive electric machine and planetary gear set assembly,
   the sleeve type rotation shaft (AS101) serves as a third output/input end of the dual-drive electric machine and planetary gear set assembly,
   a first action side of the at least one controllable brake device (BK101, BK102, and/or BK103) is controllable to lock and release at least one of the first, second, and third output/input ends of the dual-drive electric machine and planetary gear set assembly to control transmission of rotational energy between the first rotation shaft (S101), the second rotation shaft (S102) and the sleeve type rotation shaft (AS102), and thereby control interactive operations between the dual-drive electric machine (EM100) and the first, second, and third output/input ends, and
   a second action side of the at least one controllable brake device (BK101, BK102, and/or BK103) is connected to the housing (H100).

2. A dual-drive electric machine and planetary gear set assembly as claimed in claim 1, wherein the at least one controllable brake device (BK101, BK102, and/or BK103) is a controllable brake device controlled by at least one of a manual, mechanical, hydraulic, pneumatic, or electromagnetic force.

3. A dual-drive electric machine and planetary gear set assembly as claimed in claim 1, wherein the dual-drive electric machine (EM100) is a DC or AC, brush or brushless, synchronous or asynchronous dual-drive electric machine and the inner rotation part (EM101) is coaxial with the outer rotation part (EM102).

4. A dual-drive electric machine and planetary gear set assembly as claimed in claim 3, wherein the dual-drive electric machine (EM100) is arranged to receive externally input electric energy to operate as a motor for individually driving a load or for driving the load in common with an external rotary kinetic energy source, and wherein the dual-drive electric machine is arranged to receive the external rotary kinetic energy or inertial kinetic energy of the load for operating the electric machine as a power generator for driving an external electric load or for charging an external electric storing device.

5. A dual-drive electric machine and planetary gear set assembly as claimed in claim 1, wherein the sleeve type rotation shaft is rotatably sleeved on the first rotation shaft (S101), the first action side of a first said at least one controllable brake device (BK101) is engageable with the sleeve type rotation shaft (AS101), which serves as the third output/input end of the dual-drive electric machine and planetary gear set assembly, and the second action side of the first controllable brake device (BK101) is fixed to the housing (H100).

6. A dual-drive electric machine and planetary gear set assembly as claimed in claim 5, wherein the dual-drive electric machine and planetary gear set assembly is arranged to carry out the following operations:
   when the first controllable brake device (BK101) is controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;
   when the first controllable brake device (BK101) is controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);
   when the first controllable brake device (BK101) is controlled to be in a brake locking state and the dual-drive electric machine (EM100) is not operated as an electric machine, the first rotation shaft (S101) and the second rotation shaft (S102) are connected for transmission; and
   when the first controllable brake device (BK101) is controlled to be in the brake locking state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the second rotation shaft (S102).

7. A dual-drive electric machine and planetary gear set assembly as claimed in claim 1, wherein the sleeve type rotation shaft is rotatably sleeved on the first rotation shaft (S101), the first action side of a second said at least one controllable brake device (BK102) is engageable with the second rotation shaft (S102), which serves as the second output/input end of the dual-drive electric machine and planetary gear set assembly, and the second action side of the second controllable brake device (BK102) is fixed to the housing (H100).

8. A dual-drive electric machine and planetary gear set assembly as claimed in claim 7, wherein the dual-drive electric machine and planetary gear set assembly is arranged to carry out the following operations:

when the second controllable brake device (BK102) is controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the second controllable brake device (BK102) is controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the second controllable brake device (BK102) is controlled to be in a brake locking state and the dual-drive electric machine (EM100) is not operated as an electric machine, the first rotation shaft (S101) and the sleeve type rotation shaft (AS101) are connected for transmission; and when the second controllable brake device (BK102) is controlled to be in the brake locking state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the sleeve type rotation shaft (AS101).

9. A dual-drive electric machine and planetary gear set assembly as claimed in claim 1, wherein the sleeve type rotation shaft is rotatably sleeved on the first rotation shaft (S101), the first action side of a third said at least one controllable brake device (BK103) is engageable with the first rotation shaft (S101), which serves as the first output/input end of the dual-drive electric machine and planetary gear set assembly, and the second action side of the third controllable brake device (BK103) is fixed to the housing (H100).

10. A dual-drive electric machine and planetary gear set assembly as claimed in claim 9, wherein the dual-drive electric machine and planetary gear set assembly is arranged to carry out the following operations:

when the third controllable brake device (BK103) is controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the third controllable brake device (BK103) is controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the third controllable brake device (BK103) is controlled to be in a brake locking state and the dual-drive electric machine (EM100) is not operated as an electric machine, the sleeve type rotation shaft (AS101) and the second rotation shaft (S102) are connected for transmission; and when the third controllable brake device (BK103) is controlled to be in the brake locking state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the sleeve type rotation shaft (AS101) and the second rotation shaft (S102).

11. A dual-drive electric machine and planetary gear set assembly as claimed in claim 1, wherein the sleeve type rotation shaft is rotatably sleeved on the first rotation shaft (S101), the first action side of a second said at least one controllable brake device (BK102) is engageable with the second rotation shaft (S102), which serves as the second output/input end of the dual-drive electric machine and planetary gear set assembly, the first action side of a third said at least one controllable brake device (BK103) is engageable with the first rotation shaft (S101), which serves as the first output/input end of the dual-drive electric machine and planetary gear set assembly, and the second action side of each of the second controllable brake device (BK102) and the third controllable brake device (BK103) is fixed to the housing (H100).

12. A dual-drive electric machine and planetary gear set assembly as claimed in claim 11, wherein the dual-drive electric machine and planetary gear set assembly is arranged to carry out the following operations:

when the second controllable brake device (BK102) and the third controllable brake device (BK103) are both controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the second controllable brake device (BK102) and the third controllable brake device (BK103) are both controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the second controllable brake device (BK102) is controlled to be in the brake locking state, the third controllable brake device (BK103) is controlled to be in the releasing state, and the dual-drive electric machine (EM100) is not operated as an electric machine, the sleeve type rotation shaft (AS101) and the first rotation shaft (S101) are connected for transmission;

when the second controllable brake device (BK102) is controlled to be in the brake locking state, the third controllable brake device (BK103) is controlled to be in the releasing state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the sleeve type rotation shaft (AS101) and the first rotation shaft (S101);

when the second controllable brake device (BK102) is controlled to be in the releasing state, the third controllable brake device (BK103) is controlled to be in the brake locking state, and the dual-drive electric machine (EM100) is not operated as an electric machine, the second rotation shaft (S102) and the sleeve type rotation shaft (AS101) are connected for transmission;

when the second controllable brake device (BK102) is controlled to be in the releasing state, the third controllable brake device (BK103) is controlled to be in the brake locking state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the second rotation shaft (S102) and the sleeve type rotation shaft (AS101); and when the second controllable brake device (BK102) and the third controllable brake device (BK103) are both in the brake locking state, the first rotation shaft (S101), the second rotation shaft (S102) and the sleeve type rotation shaft (AS101) are all locked.

13. A dual-drive electric machine and planetary gear set assembly as claimed in claim 1, wherein the sleeve type rotation shaft is rotatably sleeved on the first rotation shaft (S101), the first action side of a first said at least one controllable brake device (BK101) is engageable with the sleeve type rotation shaft (AS101), which serves as the third output/input end of the dual-drive electric machine and planetary gear set assembly, the first action side of a third said at least one controllable brake device (BK103) is engageable with the first rotation shaft (S101), which serves as the first output/input end of the dual-drive electric machine and planetary gear set assembly, and the second action side of each of the first controllable brake device (BK101) and the third controllable brake device (BK103) is fixed to the housing (H100).

14. A dual-drive electric machine and planetary gear set assembly as claimed in claim 13, wherein the dual-drive electric machine and planetary gear set assembly is arranged to carry out the following operations:

when the first controllable brake device (BK101) and the third controllable brake device (BK103) are both controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the first controllable brake device (BK101) and the third controllable brake device (BK103) are both controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the first controllable brake device (BK101) is controlled to be in the brake locking state, the third controllable brake device (BK103) is controlled to be in the releasing state, and the dual-drive electric machine (EM100) is not operated as an electric machine, the first rotation shaft (S101) and the second rotation shaft (S102) are connected for transmission;

when the first controllable brake device (BK101) is controlled to be in the brake locking state, the third controllable brake device (BK103) is controlled to be in the releasing state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the second rotation shaft (S102);

when the first controllable brake device (BK101) is controlled to be in the releasing state, the third controllable brake device (BK103) is controlled to be in the brake locking state, and the dual-drive electric machine (EM100) is not operated as an electric machine, the second rotation shaft (S102) and the sleeve type rotation shaft (AS101) are connected for transmission;

when the first controllable brake device (BK101) is controlled to be in the releasing state, the third controllable brake device (BK103) is controlled to be in the brake locking state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the second rotation shaft (S102) and the sleeve type rotation shaft (AS101); and when the first controllable brake device (BK101) and the third controllable brake device (BK103) are both in the brake locking state, the first rotation shaft (S101), the second rotation shaft (S102) and the sleeve type rotation shaft (AS101) are all locked.

15. A dual-drive electric machine and planetary gear set assembly as claimed in claim 1, wherein the sleeve type rotation shaft is rotatably sleeved on the first rotation shaft (S101), the first action side of a first said at least one controllable brake device (BK101) is engageable with the sleeve type rotation shaft (AS101), which serves as the third output/input end of the dual-drive electric machine and planetary gear set assembly, the first action side of a second said at least one controllable brake device (BK102) is engageable with the second rotation shaft (S102), which serves as the second output/input end of the dual-drive electric machine and planetary gear set assembly, the first action side of a third said controllable brake device (BK103) is engageable with the first rotation shaft (S101), which serves as a first output/input end of the dual-drive electric machine and planetary gear set assembly, and the second action side of each of the first controllable brake device (BK101) and the second controllable brake device (BK102) is fixed to the housing (H100).

16. A dual-drive electric machine and planetary gear set assembly as claimed in claim 15, wherein the dual-drive electric machine and planetary gear set assembly is arranged to carry out the following operations:

when the first controllable brake device (BK101), the second controllable brake device (BK102), and the third controllable brake device (BK103) are all controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the first controllable brake device (BK101), and the second controllable brake device (BK102), and the third controllable brake device (BK103) are all controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the first controllable brake device (BK101) is controlled to be in the brake locking state, the second controllable brake device (BK102) and the third controllable brake device (BK103) are both controlled to be in the releasing state, and the dual-drive electric machine (EM100) is not operated as an electric machine, the first rotation shaft (S101) and the second rotation shaft (S102) are connected for transmission;

when the first controllable brake device (BK101) is controlled to be in the brake locking state, the second controllable brake device (BK102) and the third controllable brake device (BK103) are both controlled to be in the releasing state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the second rotation shaft (S102);

when the second controllable brake device (BK102) is controlled to be in the brake locking state, the first controllable brake device (BK101) and the third controllable brake device (BK103) are both controlled to be in the releasing state, and the dual-drive electric machine (EM100) is not operated as an electric machine, the first rotation shaft (S101) and the sleeve type rotation shaft (AS101) are connected for transmission;

when the second controllable brake device (BK102) is controlled to be in the brake locking state, the first controllable brake device (BK101) and the third controllable brake device (BK103) are both controlled to be in the releasing state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the sleeve type rotation shaft (AS101);

when the third controllable brake device (BK103) is controlled to be in the brake locking state, the first controllable brake device (BK101) and the second controllable brake device (BK102) are both controlled to be in the releasing state, and the dual-drive electric machine (EM100) is not operated as an electric machine, the second rotation shaft (S102) and the sleeve type rotation shaft (AS101) are connected for transmission;

when the third controllable brake device (BK103) is controlled to be in the brake locking state, the first controllable brake device (BK101) and the second controllable brake device (BK102) are both controlled to be in the releasing state, and the dual-drive electric machine (EM100) is operated as an electric machine, the inner rotation part (EM101) and the outer rotation part (EM102) interact to provide a power generator or motor function according to a damping external load or an external rotational torque, rotational direction applied to at least one of the second rotation shaft (S102) and the sleeve type rotation shaft (AS101); and when at least two of the first controllable brake device (BK101), the second controllable brake device (BK102), and the third controllable brake device (BK103) are in the brake locking state, the first rotation shaft (S101), the second rotation shaft (S102) and the sleeve type rotation shaft (S103) are all locked.

17. A dual-drive electric machine and planetary gear set assembly as claimed in claim 1, wherein the sleeve type rotation shaft is rotatably sleeved on the first rotation shaft (S101), the first action side of a first said at least one controllable brake device (BK101) is engageable with the sleeve type rotation shaft (AS101), which serves as the third output/input end of the dual-drive electric machine and planetary gear set assembly, the first action side of a second said at least one controllable brake device (BK102) is engageable with the second rotation shaft (S102), which serves as the second output/input end of the dual-drive electric machine and planetary gear set assembly, and the second action side of each of the first controllable brake device (BK101) and the second controllable brake device (BK102) is fixed to the housing (H100).

18. A dual-drive electric machine and planetary gear set assembly as claimed in claim 17, wherein the dual-drive electric machine and planetary gear set assembly is arranged to carry out the following operations:

when the first controllable brake device (BK101) and the second controllable brake device (BK102) are both controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the first controllable brake device (BK101) and the second controllable brake device (BK102) are both controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the first controllable brake device (BK101) is controlled to be in the brake locking state, the second controllable brake device (BK102) is controlled to be in the releasing state, and the dual-drive electric machine (EM100) is not operated as an electric machine, the first rotation shaft (S101) and the second rotation shaft (S102) are connected for transmission;

when the first controllable brake device (BK101) is controlled to be in the brake locking state, the second controllable brake device (BK102) is controlled to be in the releasing state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the second rotation shaft (S102);

when the first controllable brake device (BK101) is controlled to be in the releasing state, the second controllable brake device (BK102) is controlled to be in the brake locking state, and the dual-drive electric machine (EM100) is not operated as an electric machine, the first rotation shaft (S101) and the sleeve type rotation shaft (AS101) are connected for transmission;

when the first controllable brake device (BK101) is controlled to be in the releasing state, the second controllable brake device (BK102) is controlled to be in the brake locking state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the sleeve type rotation shaft (AS101); and when the first controllable brake device (BK101) and the second controllable brake device (BK102) are both in the brake locking state, the first rotation shaft (S101), the second rotation shaft (S102) and the sleeve type rotation shaft (AS101) are all locked.

\* \* \* \* \*